(Model.)
H. A. KIMBALL.
SAW SETTING MACHINE.
No. 251,055.  Patented Dec. 20, 1881.
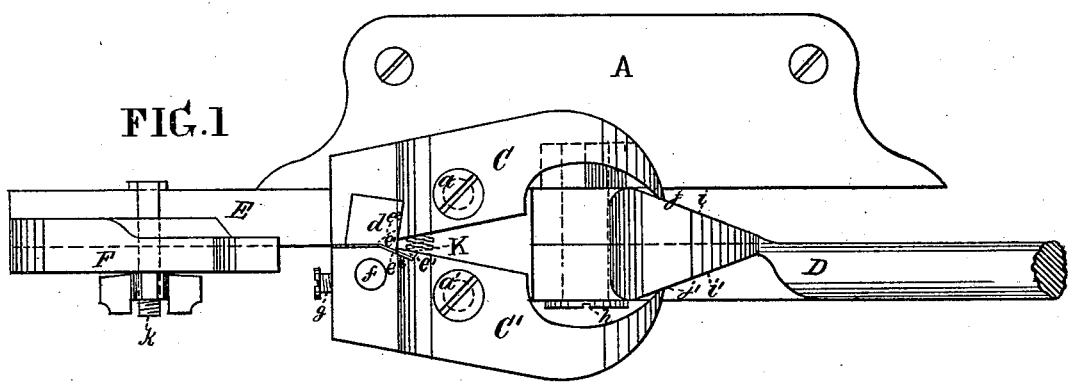
FIG. 1
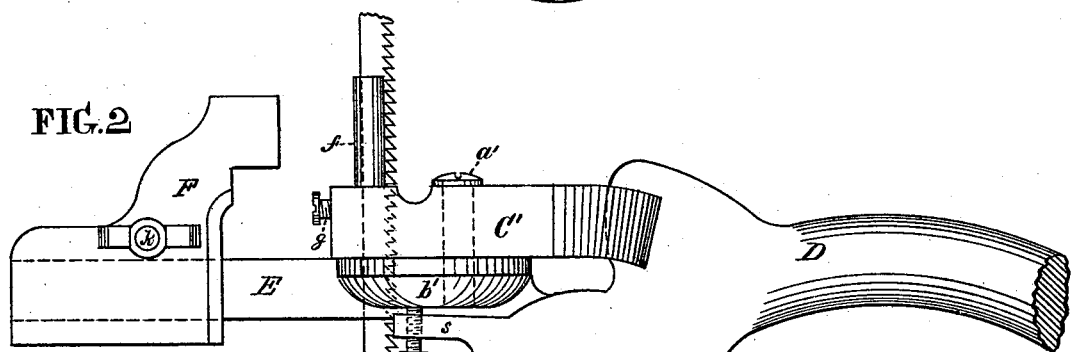
FIG. 2
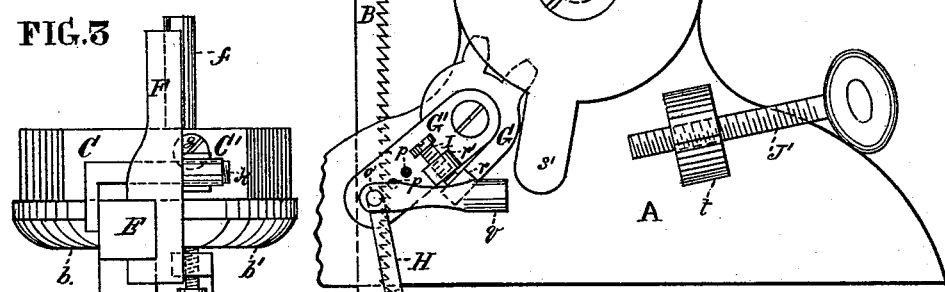
FIG. 3
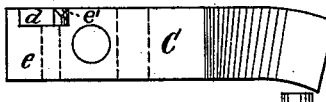
FIG. 5
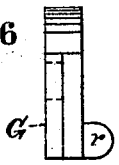
FIG. 6
FIG. 4
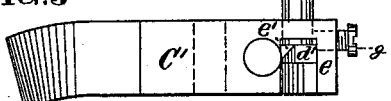
Inventor
Hiram A. Kimball.
per Stephen Ustick, att'y
Witnesses
Thomas J. Bewly
Benj. H. Wrigley

UNITED STATES PATENT OFFICE.

HIRAM A. KIMBALL, OF PHILADELPHIA, PENNSYLVANIA.

SAW-SETTING MACHINE.

SPECIFICATION forming part of Letters Patent No. 251,055, dated December 20, 1881.

Application filed February 17, 1881. (Model.)

*To all whom it may concern:*

Be it known that I, HIRAM A. KIMBALL, a citizen of the United States, residing at Philadelphia, in the county of Philadelphia and State of Pennsylvania, have invented a new and useful Improvement in Band-Saw-Setting Machines, of which the following is a specification.

The nature of my invention consists of a machine adapted to be attached to the table of a band-saw machine in such a manner that the saw may have an intermittent movement through it during the setting operation of the teeth, which operation is accomplished by means of twin levers provided respectively with a stationary and an adjustable die, which act simultaneously with each other in setting a pair of teeth at each operation, the movements of the levers and the intermittent movements of the saw being produced by means hereinafter fully described.

In the accompanying drawings, which make a part of this specification, Figure 1 is a plan view of my improved saw-setting machine. Fig. 2 is a side elevation of the same. Fig. 3 is a front elevation. Fig. 4 is an edge view of the lever C. Fig. 5 is an edge view of the lever C'. Fig. 6 is an edge view of the feed-lever G and extension G' connected therewith.

Like letters of reference in all the figures indicate the same parts.

A represents the standard which supports the several parts of my improved saw-setting machine. It is adapted to be adjusted to any band-saw by placing it on the saw-table.

B is a portion of the band-saw in connection with the machine, and in the position the front part of the saw assumes when connected with the band-saw machine.

C and' C are twin levers, having fulcrum-pins $a\, a$, connected with the flanges $b\, b'$ of the standard A. They have dies $d$ and $d'$, respectively, in their front ends. (Shown in detail in Figs. 4 and 5.) Each die has a level face, $e$, and a bevel projection, $e'$, which correspond to the like level face $e$ and a reverse bevel depression or receding surface, $e^2$, of the opposite die, so that when the dies are brought together the two level surfaces will come against the opposite sides of the blades of the saw, and the bevel surfaces will set two teeth in opposite directions at one operation. The die $d'$ is adjustable in its height by means of its vertical stem $f$ and set-screw $g$, for regulating the altitudinal distance between it and the die $d$ to correspond with the distances apart of the teeth of the saw.

D is a lever which is hung on the fulcrum-pin $h$. It has right and left inclines $i$ and $i'$, which, in the downward movement of its handle, press upon the parts $j$ and $j'$ of the die-levers C and C', respectively, and cause the dies $d$ and $d'$ to press upon two opposite teeth of the saw with their bevel projections and set them against the corresponding depressed surfaces of each opposite die, the level faces being brought flat against the sides of the saw-blade, and thereby holding it firmly in equilibrium, and thus preventing any twisting or crooking of it.

E is a horizontal bar, which projects from the front of the standard A, and is provided with a slide, F, which acts as a guide for the back edge of the saw. The slide is adjustable on the bar, and secured in its adjusted position by means of the set-screw $k$ in adaptation to saws of different widths.

G is a lever which is hung on the fulcrum-pin $l$, and has a geared connection with the lever D, as shown in Fig. 2, for the purpose of feeding the saw upward alternately with the setting of the teeth. It is provided with an extension-piece, G', connected with it by means of a tightening-screw, $m$, to provide for its adjustment. The outer end of said piece G' is provided with a finger, H, which has a catch, $n$, that engages with a tooth of the saw, so that in each upward movement of the lever D the saw is carried forward the distance of two teeth to be set. In the downward movement of said lever D, during which time two teeth are set, the finger H descends the distance of two teeth to engage again with a tooth for the next movement. To admit of the finger passing over the teeth immediately beneath, the catch $n$ is permitted to have a lateral movement by means of the finger H, having a stem, $o$, connected with the piece G' by means of one of the series of holes $p$, there being any desirable number of such holes to regulate the adjustment of the finger to the saw. The stem $o$ is provided with a weight, $q$, to incline the catch $n$ to an engagement with a saw-tooth. The piece G' has an altitudinal adjustment with the lever G by means of the lugs $r$ and $r'$ of the said piece G' and lever G, respectively, and the set-screw I, as clearly shown in Fig. 2, so as to regulate the height of the catch $n$, to carry the saw to such height that the teeth at each movement will be of corresponding height with the dies.

The downward throw of the lever D is regulated by means of the set-screw J in the projection $s$ at the front of the lever, as clearly seen in Fig. 2, and its upward movement by the set-screw J' in the lug $t$ of the standard A and the projection $s'$ of the lever. In the upward movement of the lever the front ends of the die-levers C and C' are thrown apart by the spring K.

I claim as my invention—

1. The combination of the twin levers C and C', provided respectively with the stationary die $d$ and the adjustable die $d'$, substantially as described, and the levers D and G, the lever D having inclines $i$ and $i'$, substantially in the manner and for the purpose set forth.

2. The combination of the piece G', having an adjustable finger, H, provided with a catch, $n$, with the lever G, substantially in the manner described, and for the purpose set forth.

HIRAM A. KIMBALL.

Witnesses:
THOMAS J. BEWLEY,
STEPHEN USTICK.